United States Patent
Yoon

(10) Patent No.: US 12,162,361 B2
(45) Date of Patent: Dec. 10, 2024

(54) METHOD AND APPARATUS FOR CONTROLLING DRIVING FORCE FOR DUAL-MOTOR-EQUIPPED VEHICLE

(71) Applicant: HYUNDAI MOBIS CO., LTD., Seoul (KR)

(72) Inventor: Kyung Jun Yoon, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 570 days.

(21) Appl. No.: 17/410,359

(22) Filed: Aug. 24, 2021

(65) Prior Publication Data

US 2022/0063420 A1 Mar. 3, 2022

(30) Foreign Application Priority Data

Aug. 25, 2020 (KR) .................. 10-2020-0107320

(51) Int. Cl.
*B60L 15/20* (2006.01)
*B60K 1/02* (2006.01)
*B60K 17/356* (2006.01)

(52) U.S. Cl.
CPC .............. *B60L 15/20* (2013.01); *B60K 1/02* (2013.01); *B60K 17/356* (2013.01);
(Continued)

(58) Field of Classification Search
CPC .............. B60L 15/20; B60L 2240/42; B60L 2240/461; B60L 2240/465; B60L 2260/28; B60L 2260/42; B60K 1/02; B60K 17/356
See application file for complete search history.

(56) References Cited

U.S. PATENT DOCUMENTS

| 5,634,699 A | 6/1997 | Ichikawa et al. |
| 7,634,344 B2 * | 12/2009 | Masuda ............... B60W 10/06 180/242 |

(Continued)

FOREIGN PATENT DOCUMENTS

| CN | 103384621 A | 11/2013 | |
| DE | 102016219606 A1 * | 4/2017 | ........... B60W 30/02 |

(Continued)

OTHER PUBLICATIONS

Chinese Office Action dated Jul. 22, 2023, issued in corresponding Chinese Patent Application No. 202110979243.4.

*Primary Examiner* — Jelani A Smith
*Assistant Examiner* — Nada Mahyoob Alqaderi
(74) *Attorney, Agent, or Firm* — Morgan, Lewis & Bockius LLP

(57) ABSTRACT

According to an embodiment of the present disclosure, a driving force control apparatus for a vehicle includes: a front-wheel driver; a rear-wheel driver; a wheel speed detector; a wheel vibration calculator; an estimated speed calculator that calculates an estimated vehicle speed of the vehicle; a slip-rate calculator that calculates a slip rate of each wheel; and a driving controller that reduces a driving force of the front wheel driver or the rear wheel driver when a slip rate of each wheel is greater than a preset slip rate value. The estimated speed calculator determines that the estimated vehicle speed is greater than an actual speed of the vehicle when the vibration value calculated by the wheel vibration calculator is greater than a preset vibration value.

13 Claims, 2 Drawing Sheets

(52) U.S. Cl.
CPC ..... *B60L 2240/42* (2013.01); *B60L 2240/461* (2013.01); *B60L 2240/465* (2013.01); *B60L 2260/28* (2013.01); *B60L 2260/42* (2013.01)

(56) References Cited

U.S. PATENT DOCUMENTS

| | | | | |
|---|---|---|---|---|
| 8,880,292 | B2* | 11/2014 | Shiozawa | G01M 7/02 701/37 |
| 10,189,356 | B2* | 1/2019 | Lenaga | B60L 15/025 |
| 11,794,719 | B2* | 10/2023 | Ito | B60W 10/06 |
| 2010/0147062 | A1* | 6/2010 | Wakao | B60C 99/006 73/146 |
| 2013/0231838 | A1* | 9/2013 | Shiozawa | B60L 3/102 701/32.9 |
| 2013/0325282 | A1 | 12/2013 | Terasaka et al. | |
| 2014/0088813 | A1* | 3/2014 | Kobayashi | B60W 20/20 180/65.265 |
| 2014/0358371 | A1* | 12/2014 | Kikuchi | B60W 10/18 701/37 |
| 2016/0221446 | A1* | 8/2016 | Suzuki | B60L 58/20 |
| 2016/0221467 | A1* | 8/2016 | Suzuki | B60L 15/2045 |
| 2016/0221468 | A1* | 8/2016 | Suzuki | B60L 15/2009 |
| 2016/0236672 | A1* | 8/2016 | Yanagida | B60W 10/06 |
| 2018/0079301 | A1* | 3/2018 | Kondo | B60K 17/02 |
| 2018/0264907 | A1* | 9/2018 | Kang | B60G 17/018 |
| 2019/0193568 | A1* | 6/2019 | Cho | B60T 8/17616 |
| 2019/0225087 | A1* | 7/2019 | Ernst | B60W 30/18127 |
| 2020/0088756 | A1* | 3/2020 | Oh | B60W 40/105 |
| 2020/0361465 | A1* | 11/2020 | Kim | B60K 23/0808 |
| 2021/0039493 | A1* | 2/2021 | Oh | B60L 15/2036 |
| 2021/0039630 | A1* | 2/2021 | Oh | B60T 8/175 |
| 2021/0170870 | A1* | 6/2021 | Oh | B60K 17/356 |
| 2021/0394738 | A1* | 12/2021 | Cho | B60K 23/0808 |
| 2022/0001748 | A1* | 1/2022 | Huh | B60L 50/61 |

FOREIGN PATENT DOCUMENTS

| | | | | |
|---|---|---|---|---|
| EP | 2803558 B1 | * | 6/2016 | .......... B62D 5/0463 |
| EP | 2799263 B1 | * | 5/2018 | ......... B60G 17/0195 |
| JP | 11-78844 A | | 3/1999 | |
| JP | 2008-296702 A | | 12/2008 | |
| JP | 2012-046040 A | | 3/2012 | |
| JP | 2017075536 A | * | 4/2017 | ............ B60W 30/02 |
| JP | 2018144576 A | * | 9/2018 | ............. B60K 28/16 |
| KR | 10-2004-0021913 A | | 3/2004 | |
| KR | 20140060872 | * | 5/2014 | ............ B60W 10/08 |
| KR | 20140060872 A | * | 5/2014 | |
| WO | WO-2012026441 A1 | * | 3/2012 | .............. B60L 3/102 |
| WO | WO-2015045759 A1 | * | 4/2015 | .............. B60L 15/20 |

* cited by examiner

METHOD AND APPARATUS FOR CONTROLLING DRIVING FORCE FOR DUAL-MOTOR-EQUIPPED VEHICLE

CROSS-REFERENCE TO RELATED APPLICATIONS

This application is based on, and claims priority from, Korean Patent Application Number 10-2020-0107320, filed Aug. 25, 2020, the disclosure of which is incorporated by reference herein in its entirety.

TECHNICAL FIELD

The present disclosure relates to a driving force control device for a vehicle equipped with a dual motor and a control method therefor.

BACKGROUND

The content described in this section merely provides background information for the present disclosure and does not constitute prior art.

A TCS (Traction Control System) is a drive assistance system of a vehicle for preventing the wheels from running out by repeating acceleration and braking on each wheel in order to utilize as much as possible a grip force between the wheel of the vehicle and a road surface at the moment of acceleration of the wheel. In particular, the TCS ensures acceleration performance during vehicle acceleration on a slippery road surface and prevents the phenomenon that the vehicle body is spun in the transverse direction.

The TCS generally estimates the speed of the vehicle body based on the rotational speed of a wheel of which the rotational speed is the lowest. A determination is made as to whether or not the speed of the remaining wheel is higher than that of the vehicle body based on the estimated vehicle body speed. When it is determined that the wheel is faster than the vehicle body speed, it is determined that a slip phenomenon occurs in the wheel of the vehicle, and a driving torque is limited or a braking force or the like is applied to the wheel to prevent the vehicle from slipping, thereby securing the acceleration performance, and preventing the vehicle from rotating in the transverse direction.

For the TCS, it is necessary to calculate or estimate the speed of the vehicle body. However, the vehicle body speed calculation method used in the conventional technology has a disadvantage that it is difficult to directly apply to an electric vehicle equipped with a dual-motor. An electric vehicle equipped with a dual motor independently drives a front wheel and a rear wheel. In case of electric vehicles, the driving torque increases rapidly and is greater than that of an internal combustion vehicle during vehicle acceleration. Thus, an electric vehicle equipped with a dual motor is likely to accelerate and slip occurs in all four wheels. When the speed of the vehicle body is estimated in a conventional manner for a dual-motor electric vehicle, it is estimated on the basis of the wheel on which slip occurs, and a difference from the actual running speed occurs. Here, the dual motor is composed of a front wheel motor that drives the front wheels of the vehicle and a back wheel motor that drives the rear wheels of the vehicle.

This inaccurate vehicle body speed estimation has the disadvantage that it is difficult to calculate the wheel slip, and it is impossible to calculate the driving force at which the acceleration performance of the vehicle is maximized.

SUMMARY

According to an embodiment of the present disclosure, a driving force control apparatus for a vehicle includes: a front-wheel driver configured to generate a driving force to a front wheel of the vehicle; a rear-wheel driver configured to generate a driving force to a rear wheel of the vehicle independently of the front-wheel driver; a wheel speed detector, disposed on each wheel of the vehicle, configured to generate a signal related to a wheel speed of each wheel; a wheel vibration calculator configured to calculate a vibration value of each wheel by using a value detected by the wheel speed detector; an estimated speed calculator configured to calculate an estimated vehicle speed of the vehicle using the signal and the vibration value generated by the wheel speed detector and the wheel vibration calculator; a slip-rate calculator configured to calculate a slip rate of each wheel based on the estimated vehicle speed and the wheel speed of each wheel; and a driving controller configured to reduce the driving force of the front wheel driver or the rear wheel driver when the slip rate of each wheel is greater than a preset slip rate value, wherein the estimated speed calculator determines that the estimated vehicle speed is greater than an actual speed of the vehicle when the vibration value calculated by the wheel vibration calculator is greater than a preset vibration value.

As described above, according to the present embodiment, there is an effect that the accurate vehicle body speed can be estimated by using the drive torque adjustment of the front wheel driver and the rear wheel driver and the vibration value of wheels in a vehicle acceleration situation.

Further, based on the calculated estimated vehicle speed, by utilizing the characteristics of the vehicle equipped with two independent drivers, there is an effect of independently controlling the driver of the front wheels and the rear wheels to prevent a wheel slip and ensure acceleration performance.

DETAILED DESCRIPTION

Figure 1:
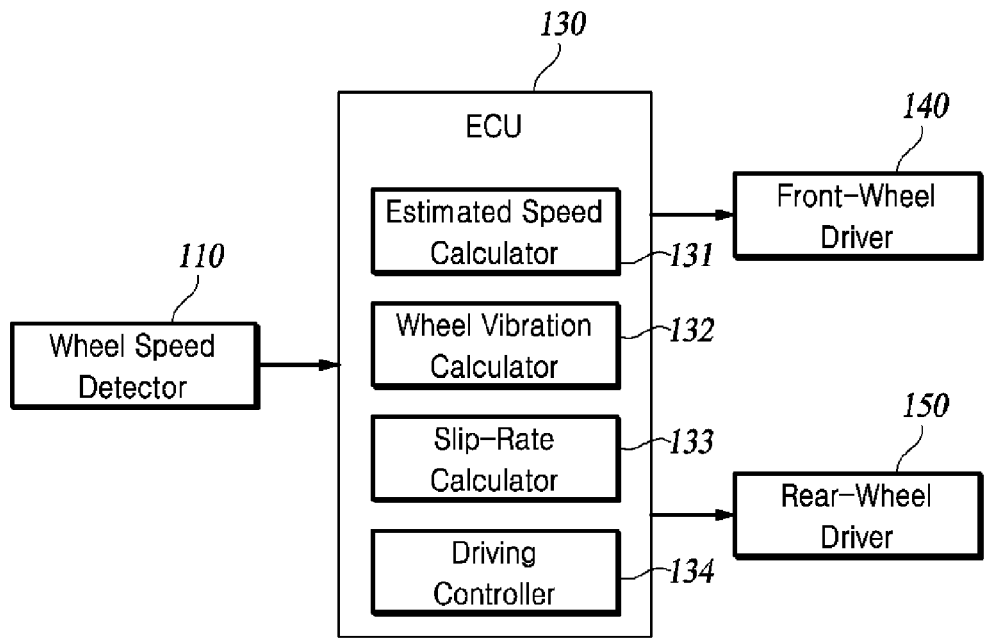
FIG. 1 is a block diagram of a driving force control device according to an embodiment of the present disclosure.

Some embodiments of the present disclosure will now be described in detail with reference to the illustrative drawings. It should be noted that, when reference numerals are added to the components in each drawing, the same components have the same numerals as possible, even if they are shown on different drawings. In the description of the present disclosure, a detailed description of a related known configuration or function is omitted when it is determined that the gist of the disclosure can be made.

In describing the components of the embodiments according to the present disclosure, reference numerals such as first, second, i), ii), a), and b) may be used. Such symbols are only for distinguishing the components from other components, and the nature or order of the components is not limited by the symbols. When a portion in the specification is referred to as "comprising" or "including" a component, it means that the component may further comprise other components rather than excluding other components unless explicitly stated to the contrary.

In describing an embodiment according to the present disclosure, a wheel speed is defined as a value obtained by converting a rotational speed of a wheel into a linear speed.

Figure 2:
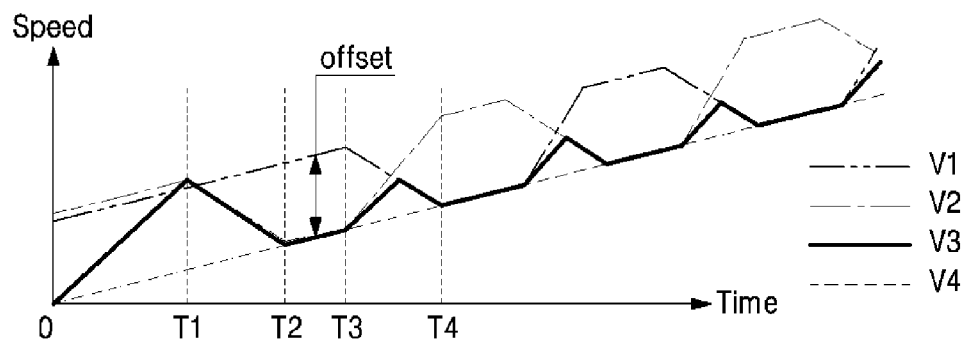
FIG. 2 is an exemplary graph showing a process of correcting the estimated vehicle speed by the driving controller of the driving force control device according to an embodiment of the present disclosure.

FIG. 1 is a block diagram of a driving force control device according to an embodiment of the present disclosure. FIG. 2 is an exemplary graph showing a process of correcting the estimated vehicle speed by the driving controller of the driving force control device according to an embodiment of the present disclosure.

Referring to FIG. 1, the driving force control device includes all or part of a wheel speed detector 110, an ECU (Electronic Control Unit) 130, a front-wheel driver 140, and a rear-wheel driver 150.

The wheel speed detector 110 is disposed on each wheel of the vehicle to generate a signal related to the wheel speed. A wheel speed signal generated by the wheel speed detector 110 is transmitted to the ECU 130. The wheel speed detector 110 may include an active/passive wheel speed sensor, a wheel speed sensor pursuant to the PWM (Pulse Width Modulation) specification, a wheel speed sensor pursuant to the VDA (Verband Der Automobilindustrie, German Automobile Industry Standard), or the like.

The ECU 130 receives a signal related to the wheel speed from the wheel speed detector 110 to calculate the wheel speed of each wheel, and generates a control signal for a wheel vibration calculator 132 that calculates a wheel vibration value, and for adjusting outputs of front wheel driver 140 and rear wheel driver 150 for adjusting the wheel speed. The ECU 130 may be a processor (e.g., computer, microprocessor, CPU, ASIC, circuitry, logic circuits, etc.) and includes all or part of a wheel vibration calculator 132, an estimated speed calculator 131, and a slip-rate calculator 133 and a driving controller 134. The processor may have an associated non-transitory memory storing software instructions which, when executed by the processor, provides the functionalities of all or part of the wheel vibration calculator 132, the estimated speed calculator 131, and the slip-rate calculator 133 and the driving controller 134.

The wheel vibration calculator 132 generates a signal related to the wheel vibration using the value detected by the wheel speed detector 110. The acceleration of each wheel may be measured by using a wheel speed sensor disposed on each wheel. The wheel vibration calculator 132 determines that the larger the value of acceleration or deceleration at the time of the acceleration or deceleration of each wheel is, the larger the vibration value is. The wheel vibration calculator 132 can sense vibration of each wheel while the vehicle is traveling, and the ECU 130 knows whether a slip phenomenon occurs in each wheel.

The estimated speed calculator 131 calculates an estimated speed of the vehicle by using a signal related to the wheel speed generated by the wheel-speed detector 110 and a signal related to the vibration generated by the wheel-vibration calculator 132. The estimated vehicle speed of the vehicle is estimated based on the wheel speed of a wheel having the lowest wheel speed among the respective wheels or the vehicle speed based on an average wheel speed of a wheel, but the method of calculating the estimated vehicle speeds is not necessarily limited thereto.

In this case, the estimated-speed calculator 131 determines that the estimated vehicle speed differs from the actual speed of the vehicle when the vibration value of the wheel on which the estimated vehicle speed calculation is based is larger than a preset vibration threshold value. That is, the estimated speed calculator 131 determines that a correction of the estimated vehicle speed is necessary. The preset vibration threshold value may be increased or decreased according to the magnitude of the acceleration or deceleration values input to the controller. In addition, the preset vibration threshold value may vary depending on the size, weight, and performance of the driving unit, and each vehicle has a different preset vibration value. When a slip occurs in the wheel, the value of the acceleration or the deceleration becomes large, and therefore the wheel vibration calculator 132 may determine that the vibration value of the wheel is large.

As another embodiment, the estimated-speed calculator 131 compares the magnitude of the input torque calculated based on the input of an accelerator pedal with the amount of the control torque calculated from the driving controller 134 to determine that the correction of the estimated vehicle speed is necessary even when the input torque is greater than the control torque.

For example, the estimated speed calculator 131 may estimate the speed of the vehicle with reference to a wheel having the lowest wheel speed among the wheels of the vehicle. This is because it can be assumed that the wheel with the lowest wheel speed is running without slip while keeping the grip force with the road surface as much as possible. However, in the case of a dual-motor-equipped vehicle, the drive torque rises faster and is greater than that of an internal combustion vehicle. Slip can occur in all four wheels as the wheels are driven by two motors. In this case, even if the speed of the vehicle is estimated based on the wheel whose wheel speed is the lowest, the vehicle speed is estimated based on the wheel whose slip is occurring. Thus, an error may occur between the estimated vehicle speed and the actual speed. In this case, the estimated speed calculator 131 determines that a correction of the estimated vehicle speed is necessary.

Since the estimated speed calculator 131 determines that slip occurs in all the wheels, it determines that the correction of the estimated running speed is necessary. The predetermined value here may vary depending on the size of the vehicle, the type of vehicle, the size of a wheel, etc. Further, the predetermined value may vary depending on the road surface condition. The ECU 130 may get the information on the condition of the road surface through an image sensor and a radar mounted on the vehicle. The estimated speed calculator 131 may change the predetermined value in real time based on the information about the condition.

The slip ratio calculator 133 calculates a slip-rate of each wheel based on the estimated running speed and the wheel speed of the wheel. The slip ratio calculator 133 determines that the vehicle slip has occurred when the wheel speed of the wheel is greater than the estimated vehicle speed. The slip ratio calculator 133 transmits to the driving controller 134 the information that it is necessary to control the outputs of the front wheel driver 140 and the rear wheel driver 150 when the slip ratio of the wheel on which the slip has occurred is greater than a predetermined value.

When the slip ratio of each wheel is greater than a predetermined value, the driving controller 134 serves to reduce the driving force of the front wheel driver 140 and the back wheel driver 150, and apply a braking force to each wheel, and the like.

When the estimated speed calculator 131 determines that the estimated vehicle speed of the vehicle does not coincide with the actual vehicle speed, the driving controller 134 reduces the output of the front wheel driver 140 or the rear wheel driver 150 in order to reduce the driving force for the front wheels or the rear wheels. The driving controller 134 first reduces the output of the front wheel driver 140 or the rear wheel driver 150 until the vibration value of the respective front wheels or the rear wheels becomes smaller than the predetermined value of the estimated speed calculator 131. When the wheel speed is equal to or smaller than the estimated speed reference, the estimated-speed calculator 131 determines that the estimated vehicle speed matches or approaches the actual speed of the vehicle.

The driving controller 134 preferably reduces the output of the rear wheel driver 150 rather than the front wheel driver 140. The slip of the rear wheels can cause the yaw behavior of the vehicle to lose the steering performance and cause a spinout phenomenon to rotate the vehicle. Therefore, for stabilizing the vehicle, it is preferable to reduce the wheel speed of the rear wheels to correct the estimated vehicle speed, rather than the front wheels, and the present embodiment will be described accordingly. However, the estimated vehicle speed correction of the wheel is not necessarily limited to preferentially decelerating the wheel speed of the rear wheel driver.

After the correction of the estimated vehicle speed is completed by the estimated speed calculator 131, the driving controller 134 again increases the wheel speed of the front wheel or the rear wheel having the reduced wheel speed, and decreases the wheel speeds of the remaining front wheels or rear wheels having no reduced wheel speed. In addition, the driving controller 134 induces acceleration of the vehicle while repeatedly increasing and decreasing the wheel speeds of the front wheels and the rear wheels while the vehicle is traveling. By increasing and decreasing the speeds of the front wheels and the rear wheels, the accuracy of the vehicle speed estimation can be increased and the acceleration performance can be maximized at the same time.

When the wheel speed of the front wheel or the rear wheel is increased after the correction of the estimated vehicle speed is finished, the driving controller 134 does not increase the increased wheel speed for the front wheels or rear wheels such that the difference is greater than or equal to a predetermined offset value from the corrected estimated vehicle speed. When there is a difference of a certain value or more between the increased wheel speed of the front wheel or the rear wheel and the corrected estimated vehicle speed, an excessive slip occurs, which deteriorates the acceleration performance of the vehicle.

The front wheel driver 140 generates a braking force and a driving force on the front wheels of the vehicle. The front wheel driver 140 adjusts the output based on a control signal received from the driving controller 134.

The rear wheel driver 150 generates a braking force or a driving force on the rear wheel of the vehicle independently of the front wheel driver 140. The rear wheel driver 150 also adjusts the output based on the control signal received by the travel control section 134 similarly to the front wheel driver 140.

The front wheel driver 140 and the rear wheel driver 150 independently adjust the wheel speeds of the front wheels and the rear wheels, respectively. The front wheel driver 140 and the rear wheel driver 150 may be motors.

Graphs in FIG. 2 show the changes in front-wheel target speed V1, rear-wheel targeted speed V2, estimated vehicle speed V3, and actual speed V4 of the vehicle over time when the vehicle to which the embodiment of the present disclosure is applied accelerates.

In the interval between 0 and T1, the driving controller 134 sets the speeds of the front wheel target speed V1 and the rear wheel target speeds V2 for vehicle acceleration. At T1, the estimated vehicle speed V3 and the front wheel and rear wheel target speeds V1 and V2 coincide with each other, but a deviation occurs between the estimated travel speed V3 and the actual speed V4 of the vehicle. This is because slip occurs in all the wheels. If the estimated running speed V3 is not corrected, the slip ratio calculator 133 may erroneously determine that no slip occurred despite the occurrence of slip on all wheels of the vehicle.

In the interval between T1 and T2, the driving controller 134 lowers the output of the rear wheel driver 150 to reduce the rear-wheel target speed V2. Here, the estimated vehicle speed V3 is calculated based on the speed of the wheel of which the speed is the lowest. Since the speed of the rear wheel is reduced while the target rear wheel speed V2 is lowered, the estimated vehicle speed V3 is also reduced. The driving controller 134 lowers the rear wheel target speed V2 until it is determined that the estimated vehicle speed V3 matches or approaches the actual speed V4 of the vehicle. At time T2, the estimated vehicle speed V3 and the actual speed V4 of the vehicle coincide or approach each other.

In the interval between T2 and T3, the driving controller 134 increases the rear wheel target speed V2 and the front wheel target speed V1 by a desired slope of the acceleration in order to accelerate the vehicle. In this section, the front wheel target speed V1 is higher than the estimated vehicle speed V3, and slip occurs in the front wheel. The slip ratio of the front wheels is such that the difference between the front wheel target speed V1 and the estimated vehicle speed V3 does not exceed a predetermined offset value so as not to be larger than the value set by the slip ratio calculator 133. Thus, even if slip occurs in the front wheels in this interval, the vehicle can maintain a normal acceleration performance without deteriorating steering performance.

In the interval between T3 and T4, the driving controller 134 increases the rear wheel target speed V2 again to induce an increase in the rear-wheel speed, and decreases the front-wheel target speed V1. After T4, the process from T2 to T4 is repeated to accelerate the vehicle while crossing the front wheel target speed V1 and the rear wheel target speed V2 as shown in FIG. 2.

Figure 3:
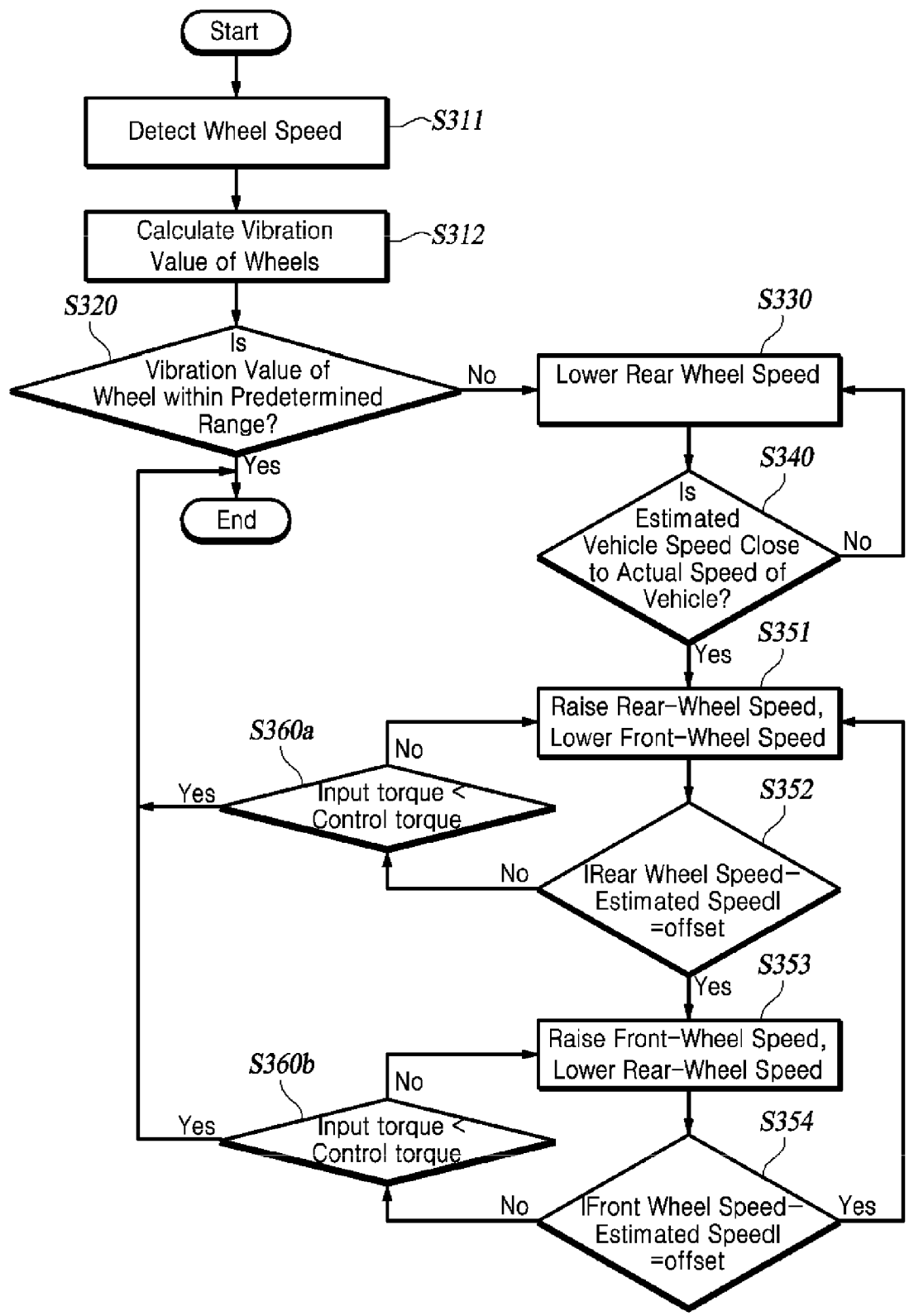
FIG. 3 is a flowchart of a driving force control method according to an embodiment of the present disclosure.

FIG. 3 is a flowchart of a driving force control method according to an embodiment of the present disclosure.

Referring to FIG. 3, the driving force control method includes all or part of the ten steps described below.

The algorithm begins when an acceleration input is received from the accelerator pedal. When the vehicle starts moving, the wheel speed of the wheel is detected (S311). The wheel speeds of the four wheels of the vehicle are individually detected. The estimated vehicle speed of the vehicle is calculated based on the detected wheel speed. The estimated vehicle speed of the vehicle is estimated based on the wheel speed of a wheel having the lowest wheel speed among the respective wheels or the vehicle speed based on average wheel speeds of the wheels, but the method of calculating the estimated vehicle speeds is not necessarily limited thereto.

After detecting the wheel speed of the wheel, the vibration value of the wheels is calculated (S312). The vibration value of the wheel is determined on the basis of the value of acceleration or deceleration at the time of accelerating or decelerating each wheel, and it is determined that the larger the value of acceleration or deceleration, the larger the vibration value. In other words, the vibration value of the wheel is proportional to the magnitude of the acceleration or deceleration value of the wheel.

After calculating the vibration value of the wheel, it is determined whether or not the vibration values of the four wheels are within a predetermined range (S320). When it is determined that the vibration value of the wheel is within the predetermined range from the set vibration threshold value, the algorithm ends. After completion of the algorithm, the ECU 130 applies a TCS (Traction Control System) to control the vehicle.

When it is determined that the vibration value of the wheel is not within a certain range from the set vibration threshold value, a slip may occur in the wheel, and the calculated estimated vehicle speed may be different from the actual speed of the vehicle. In this case, the driving controller 134 lowers the rear wheel target speed to reduce the wheel speed of the rear wheels (S330). In this case, the traveling control section 134 may first reduce the wheel speed of the front wheels, but it is preferable to first reduce the wheel speed in the rear wheels for safety of travel.

After the wheel speed of the rear wheel is reduced, the estimated speed calculator 131 determines whether or not the estimated vehicle speed is close to the actual speed of the vehicle (S340). Here, the actual speed of the vehicle means an actual vehicle speed of a vehicle. When the estimated vehicle speed is not close to the actual speed of the vehicle, the process returns to Step S330, and the rear wheel target speed is lowered until it is close.

When it is determined that the estimated vehicle speed is close to the actual speed of the vehicle, the driving controller 134 increases the rear wheel speed by again raising the rear-wheel target speed, and decreases the front-wheel speed by lowering the front wheel target speed (S351). In this step, since the front wheel speed is lower than the rear wheel speed, the estimated vehicle speed is calculated based on the front wheel speed. The driving controller 134 may set a certain time delay as in the interval between T2 and T3 in FIG. 2 when the process proceeds to the process S351 at Step S340.

At Step S352, it is determined whether the magnitude of the difference between the increased rear wheel speed and the estimated running speed occurs by as much as the difference in the offset magnitude. The offset value is set to a value such that the vehicle ensures a normal acceleration performance and the spin-out phenomenon does not occur in the vehicle. If not, the process returns to Step S351. At Step S351, the ECU 130 compares the input torque from the accelerator pedal with the magnitude of the control torque determined by the driving controller 134 to determine whether or not the procedure will end (S360*a*).

When the increased rear wheel speed differs from the estimated vehicle speed by the offset amount, the driving controller 134 again increases the wheel speed of the front wheels and decreases the wheel speeds of the rear wheels (S353). The normal acceleration performance can be secured by crossing the wheel speeds of the front wheels and the rear wheels. At this time, similarly, the driving controller 134 may set a constant time delay between the S352 process and the S353 process as in the interval between T2 and T3 in FIG. 2.

At Step S354, it is determined whether or not the difference magnitude between the increased front wheel speed and the estimated vehicle speed occurs by as much as the offset difference. The offset value may be set to have the same value as the offset value determined at Step S352 or to be different. If not, the process returns to Step S353. At Step S353, the ECU 130 compares the input torque input from the accelerator pedal with the magnitude of the control torque determined by the driving controller 134 to determine whether or not the procedure will end (S360*b*). When the increased front wheel speed differs from the estimated vehicle speed by as much as the offset amount, the procedure proceeds again to Step S351.

Steps S360*a* and S360*b* for determining whether to end the algorithm of FIG. 3 are not limited as shown in FIG. 3, and may be included between the respective steps. Further, the embodiment of FIG. 3 has preferentially reduced the rear wheel speed, but is not limited thereto, and may first reduce the front wheel speed.

During the repetition of Steps S351 through S354, the estimated speed calculator 131 receives the vibration value of each wheel from the wheel vibration calculator 132, and continuously determines whether the estimated vehicle speed matches or approaches the actual speed of the vehicle. It is possible to ensure the acceleration performance while ensuring the accuracy of the vehicle speed estimation while repeating Steps S351 to S354.

As described above, in one embodiment of the driving force control method, the speed of the vehicle can be accurately estimated by adjusting the driving torque of each driver even in an acceleration state of the vehicle in which two independent drivers are disposed, and the acceleration performance of the vehicles can be secured.

The foregoing description is merely illustrative of the teachings of the present embodiments, and various modifications and changes may be made without departing from the essential characteristics of the embodiments by those skilled in the art. Therefore, the present embodiments are not intended to limit the technical idea of the present embodiment, but are intended to be described, and the scope of the technical concept of this embodiment is not limited by this embodiment. The scope of protection of the present embodiment is to be interpreted by the following claims, and all technical ideas that fall within the equivalent scope thereof should be interpreted to be included in the scope of the present embodiment.

REFERENCE NUMERALS 110 wheel speed detector
131 Estimated speed calculator
132 Wheel vibration calculator
133 slip ratio calculator
134 driving controller
140 front wheel driver

What is claimed is:

1. A driving force control apparatus for a vehicle comprising:
    a front wheel driver configured to generate a driving force to a front wheel of the vehicle;
    a rear wheel driver configured to generate a driving force to a rear wheel of the vehicle independently of the front wheel driver;
    a wheel speed detector, disposed on each wheel of the vehicle, configured to generate a signal related to a wheel speed of each wheel;
    a wheel vibration calculator configured to calculate a vibration value of each wheel by using a value detected by the wheel speed detector;
    an estimated speed calculator configured to calculate an estimated vehicle speed of the vehicle using the wheel speed of a wheel having a lowest wheel speed among wheels of the vehicle or using an average wheel speed;
    a slip-rate calculator configured to calculate a slip rate of each wheel using the estimated vehicle speed and the wheel speed of each wheel; and a driving controller configured to reduce the driving force of the front wheel driver or the rear wheel driver upon determining the slip rate of each wheel is greater than a preset slip rate value, wherein the estimated speed calculator determines that the estimated vehicle speed is greater than an actual speed of the vehicle upon determining that the vibration value calculated by the wheel vibration calculator is greater than a preset vibration value.

2. The driving force control apparatus of claim 1, wherein upon determining that the estimated vehicle speed is greater than the actual speed of the vehicle, the estimated speed calculator determines that a correction of the estimated vehicle speed is necessary, and the driving controller reduces the driving force of either the front wheel driver or the rear wheel driver until the vibration value of the front wheel or the rear wheel becomes smaller than the preset vibration value, and adjusts the estimated vehicle speed until after the vibration value of the front wheel or the rear wheel becomes smaller than the preset vibration value.

3. The driving force control apparatus of claim 2, wherein the slip-rate calculator calculates the slip rate of each wheel by using the adjusted estimated vehicle speed.

4. The driving force control apparatus of claim 2, wherein after adjusting the estimated vehicle speed, the driving controller increases the wheel speed of the front wheel or the rear wheel that has been reduced, and decreases the wheel speed of a remaining one between the front and rear wheels that has not been reduced.

5. The driving force control apparatus of claim 4, wherein the driving controller repeatedly increases and decreases the wheel speeds of the front wheel and the rear wheel while crossing the wheel speeds of the front wheel and the rear wheel.

6. The driving force control apparatus of claim 4, wherein the driving controller does not increase the wheel speed of the front wheel or the rear wheel up to a speed higher than the adjusted estimated vehicle speed by a predetermined offset value or more.

7. The driving force control apparatus of claim 1, wherein the front wheel driver and the rear wheel driver are electric motors.

8. A method for controlling a driving force for a vehicle, comprising steps of:

detecting wheel speeds of a front wheel and a rear wheel of the vehicle;

calculating vibration values of the front wheel and the rear wheel;

determining whether the vibration values of the front wheel and the rear wheel fall within a predetermined range from a preset vibration threshold value;

calculating an estimated vehicle speed of the vehicle using the wheel speed of a wheel having a lowest wheel speed among wheels of the vehicle or using an average wheel speed, determining that the estimated vehicle speed is greater than an actual speed of the vehicle upon determining that the vibration values of the front wheel and the rear wheel do not fall within the predetermined range from the preset vibration threshold value;

and reducing the driving force of a rear wheel driver to reduce the wheel speed of the rear wheel, upon determining that the estimated vehicle speed is greater than the actual speed of the vehicle.

9. The method of claim 8, wherein the step of determining whether the estimated vehicle speed is greater than an actual speed of the vehicle comprises determining that a correction of the estimated vehicle speed is necessary, upon determining that the vibration values of the front wheel and the rear wheel do not fall within the predetermined range from the preset vibration threshold value, and the step of reducing the driving force of a rear wheel driver to reduce the wheel speed of the rear wheel comprises:

reducing the driving force of the rear wheel driver until the vibration values of the front wheel and the rear wheel fall within the predetermined range from the preset vibration threshold value; and adjusting the estimated vehicle speed until after the vibration values of the front wheel and the rear wheel fall within the predetermined range from the preset vibration threshold value.

10. The method of claim 9, further comprising a step of after adjusting the estimated vehicle speed, increasing the driving force of the rear wheel driver that has been reduced and decreasing the driving force of a front wheel driver.

11. The method of claim 10, wherein the step of increasing the driving force of the rear wheel driver and decreasing the driving force of a front wheel driver comprises increasing the driving force of the rear wheel driver until a difference between the wheel speed of the rear wheel and the estimated vehicle speed becomes a set offset.

12. The method of claim 11, further comprising a step of reducing the driving force of the rear wheel driver again and increasing the driving force of the front wheel driver that has been reduced, upon determining that the difference between the wheel speed of the front wheel and the estimated vehicle speed becomes the set offset.

13. The method of claim 10, further comprising repeatedly increasing and decreasing the wheel speeds of the front wheel and the rear wheel while crossing the wheel speeds of the front wheel and the rear wheel.

* * * * *